United States Patent
Pennington

(10) Patent No.: US 7,212,154 B2
(45) Date of Patent: May 1, 2007

(54) APPARATUS FOR PRODUCING AN AMPLIFIED RADIO FREQUENCY PULSE

(75) Inventor: David Charles Pennington, Romsey (GB)

(73) Assignee: Roke Manor Research Limited, Romsey (GB)

( * ) Notice: Subject to any disclaimer, the term of this patent is extended or adjusted under 35 U.S.C. 154(b) by 86 days.

(21) Appl. No.: 11/122,042

(22) Filed: May 5, 2005

(65) Prior Publication Data

US 2005/0259000 A1 Nov. 24, 2005

(30) Foreign Application Priority Data

May 18, 2004 (GB) ................. 0411041.7

(51) Int. Cl.
*G01S 7/282* (2006.01)

(52) U.S. Cl. ............. 342/202; 342/203; 342/204

(58) Field of Classification Search ........ 342/200–204, 342/118, 127–137, 82–88
See application file for complete search history.

(56) References Cited

U.S. PATENT DOCUMENTS

| | | | |
|---|---|---|---|
| 2,426,182 A * | 8/1947 | De Lange ............ | 342/92 |
| 3,044,061 A * | 7/1962 | Richmond et al. ..... | 342/15 |
| 3,226,717 A * | 12/1965 | Benjamin ............ | 342/83 |
| 3,806,926 A * | 4/1974 | Page ................ | 342/14 |
| 4,034,372 A * | 7/1977 | Margerum ........... | 342/15 |
| 4,600,892 A | 7/1986 | Wagner et al. | |
| 5,075,635 A | 12/1991 | Boulanger et al. | |
| 5,101,172 A | 3/1992 | Ikeda et al. | |
| 5,101,173 A | 3/1992 | DiPiazza et al. | |
| 5,182,624 A | 1/1993 | Hopkins | |
| 5,365,190 A | 11/1994 | Yu et al. | |
| 5,402,086 A | 3/1995 | Cote | |
| 5,420,536 A | 5/1995 | Faulkner et al. | |
| 5,463,396 A * | 10/1995 | Lewis ............... | 342/15 |
| 5,623,266 A * | 4/1997 | Grigsby ............. | 342/14 |
| 5,675,288 A | 10/1997 | Peyrotte et al. | |
| 6,130,636 A * | 10/2000 | Severwright ......... | 342/120 |
| 2002/0079964 A1 | 6/2002 | Miyatani | |
| 2002/0171482 A1 | 11/2002 | Sasho et al. | |
| 2005/0259000 A1 * | 11/2005 | Pennington ......... | 342/202 |

FOREIGN PATENT DOCUMENTS

EP  1 111 868 A2  6/2001

* cited by examiner

*Primary Examiner*—John B. Sotomayor
(74) *Attorney, Agent, or Firm*—Crowell & Moring LLP

(57) ABSTRACT

Apparatus for producing an amplified Radio Frequency pulse includes a controller for monitoring the output amplified pulse and determining therefrom a correction for a deviation in the characteristics. The correction is applied by a phase shifter or amplitude controller for subsequent pulses. The apparatus is particularly applicable to pulses used by RADAR equipment and allows the use of longer duration pulses. This improves the detection range of the equipment.

8 Claims, 3 Drawing Sheets

APPARATUS FOR PRODUCING AN AMPLIFIED RADIO FREQUENCY PULSE

This invention relates to apparatus for producing an amplified Radio Frequency (RF) pulse particularly for use in a RADAR system.

Such systems transmit pulses of energy which are scattered by objects with some of the scattered energy being detected by a receiver. In order to increase the detection range of such systems, it is desirable to transmit more energy so that which is reflected back to the receiver is all the greater and hence the object more readily detectable.

Power amplifiers have characteristics which limit the maximum magnitude of their output power to avoid distortion and thus a straightforward solution of increasing the power output is not feasible. One way that has been proposed to increase the energy incident on an object is to transmit a pulse for a longer period. For a given magnitude of pulse, a longer pulse results in more energy being transmitted. However, because a power amplifier's characteristics (in terms of power droop and phase for example) tend to change with time due to, for example, heating effects, this approach is considered problematic.

According to the invention there is provided apparatus for producing an amplified Radio Frequency (RF) pulse comprising: an input for receiving an RF pulse to be amplified, a phase shifter for shifting the phase of the RF pulse to be amplified, an amplifier for amplifying the RF pulse to be amplified after the pulse has passed through the phase shifter to produce the amplified RF pulse at an output, a controller coupled to the output to determine from the output a current deviation of a parameter of the amplified RF pulse and further coupled to the phase shifter to control the phase shifter to provide a phase shift to reduce the deviation for the next amplified RF pulse based on the current deviation.

Specific embodiments of the invention will now be described, by way of examples only, with reference to the drawings in which.

Figure 1:
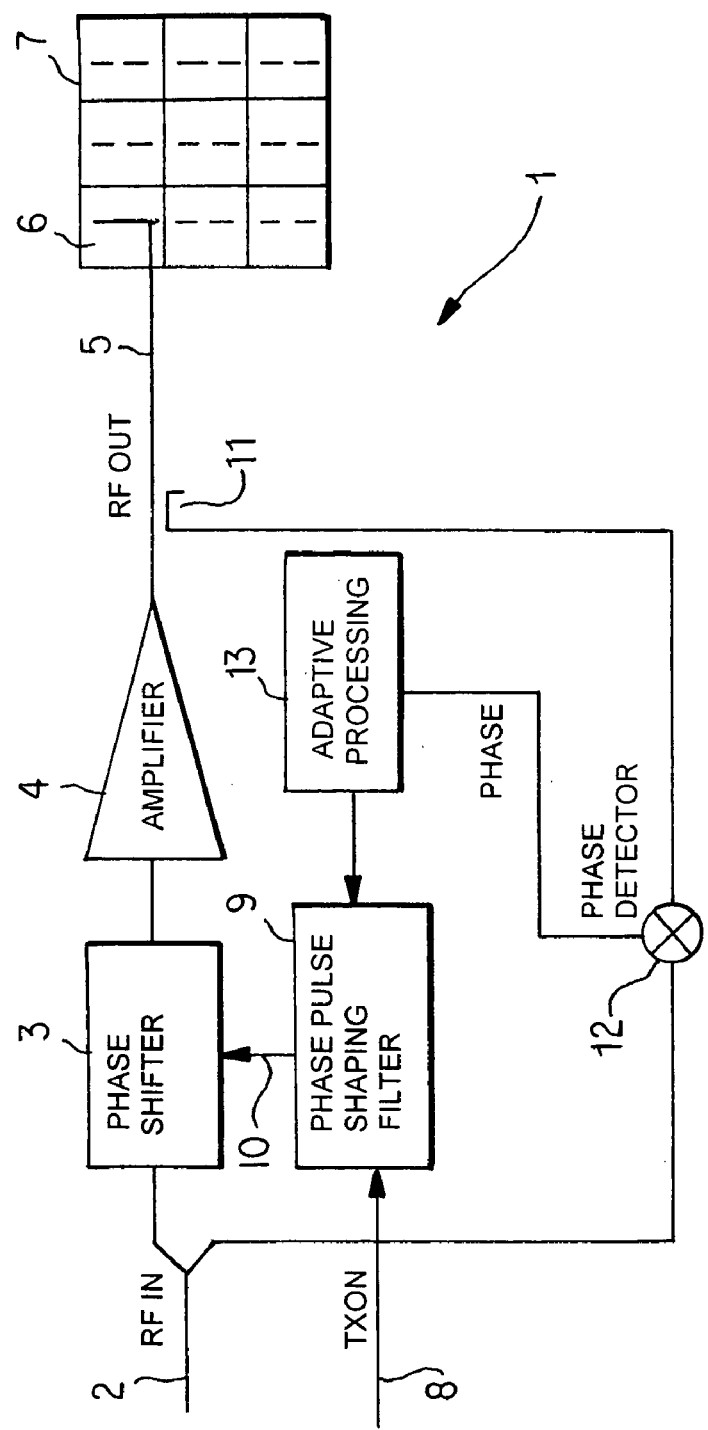
FIG. 1 shows an output stage of an RF source in accordance with a first embodiment of the invention.

As is shown in FIG. 1, an output stage 1 of an RF (Radio Frequency) source for use, for example, in a phased array RADAR, comprises a RF input 2 connected to a RF oscillator (not shown). The input 2 is coupled to a phase shifter 3 which is in turn connected to a power amplifier 4. The power amplifier 4 produces an amplified output which is coupled by output 5 to an antenna element 6. The antenna element may be a dipole or antenna horn or other means to radiate the RF energy. The element is one of many in a phased array antenna 7 which produces a moving transmit and receive beam by phase control techniques in manner known to a person skilled in the art. The output stage is replicated to provide one stage per antenna element of the array 7.

The RF signal applied to the input 2 is done so to provide a well defined pulse. When this occurs a TXON signal is generated. The TXON signal is applied to a TXON signal input 8 of the output stage 1. This is coupled to a phase pulse shaping filter 9. The phase pulse shaping filter 9 provides a control output 10 coupled to the phase shifter 3.

A coupler 11 is provided to couple a fraction of the output RF signal to a phase detector 12. The phase detector 12 is also connected to the RF input 2 and thus calculates a phase difference between the RF input 2 and the RF output.

A signal representing this difference is applied to an adaptive processor 13. The adaptive processor 13 provides a correction signal to the phase pulse shaping filter 9. The phase pulse shaping filter 9 is responsive to the signal to modify the control signal applied to the phase shifter 3 by means of the control output 10. In control method of this embodiment, power droop of the pulse is not controlled only phase rotation is corrected.

Figure 2:
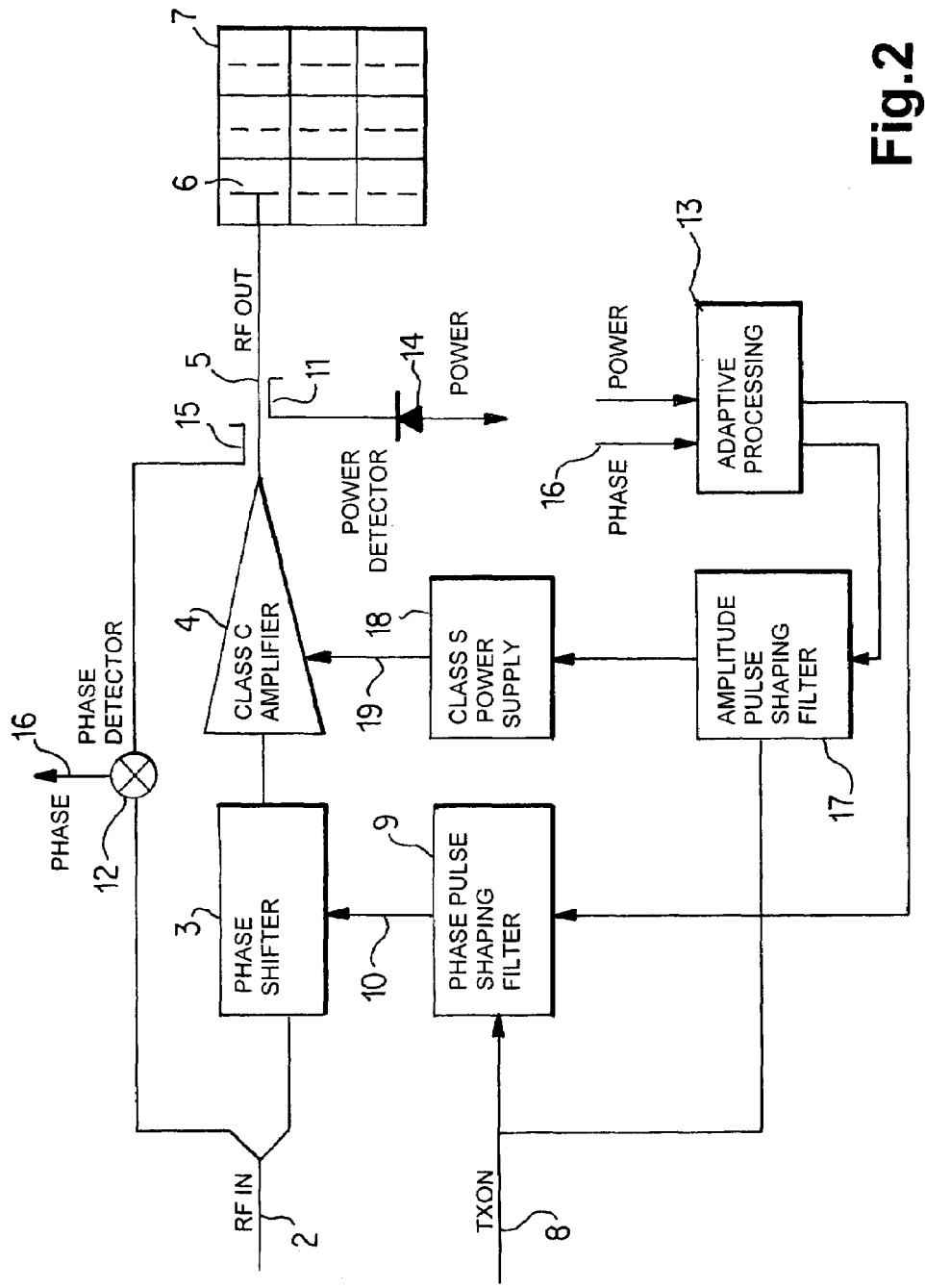
FIG. 2 shows a second embodiment of the invention again providing an output stage of an RF source.

A second embodiment of the invention shown in FIG. 2 in which both phase and amplitude of the pulse are controlled. In the description of the second embodiment like features will bear the same numerals as in the first. Again, there is an RF input 2 connected to an RF source (not shown). This provides an RF signal to a phase shifter 3 which is then passed to a power amplifier 4 (in this case a class C power amplifier). The amplified RADAR pulse is passed to an output 5 and then to a radiative element 6 of an antenna array 7. A portion of the output power is coupled by coupler 11 and a diode 14 to an adaptive processor 13.

A transmit on signal TXON is applied to an input 8 to a phase pulse shaping filter 9. This provides a correction signal 10 to the phase shifter 3.

A phase detector 12 is provided with a coupler 15 which couples a portion of the output pulse to the phase detector 12. This makes a comparison with the phase of the input RF signal to produce an error signal 16 which is applied to the adaptive processor 13.

The adaptive processor 13 of the second embodiment differs to that of the first. It acts on both input power and phase error signals to generate respective correction signals applied to an amplitude pulse shaping filter 17 and to the phase pulse shaping filter 9.

The amplitude pulse shaping filter 17 is also coupled to receive the TXON signal from input 8 and provides a control signal to a class S power supply 18. The power supply 18 additional power to the amplifier 4 when required.

The adaptive processor 13 provides a control signal to the phase pulse shaping filter 9 as before.

Both embodiments generate a long duration pulse. In doing this a potential target illuminated by the RADAR receives more energy and then reflects back to the RADAR more energy for detection. Accordingly, the range of the RADAR is increased. However, two effects arise as the pulse length increases which lead to the power dropping off with time. A first effect can arise because of a fall in the voltage of the power supply and the second arises due to thermal effects in the amplifier and the temperature rise during the pulse. The pulse power fall off or "droop" can be of the order of 1 dB for a long pulse.

This leads to the insertion phase and gain of the RADAR changing during the pulse. This may have the effect of the array pattern moving its pointing angle or the pattern becoming broader.

Figure 3:
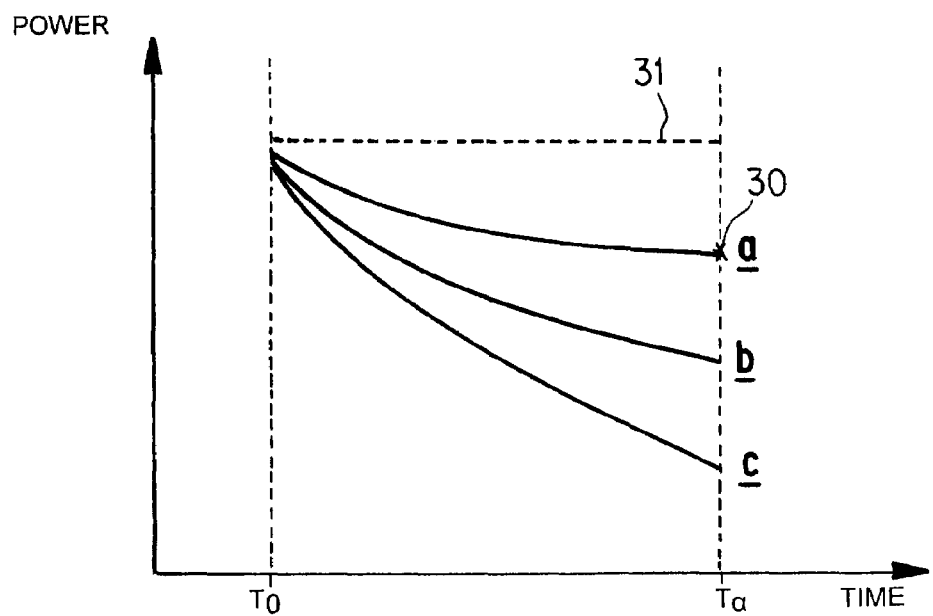
FIG. 3 shows a graph of the power characteristics of the output pulse with time.

FIG. 3 shows the power characteristics of a RADAR pulse with time. On the time axis $T_o$ represents the start of the pulse and $T_d$ the end of the pulse. Plots a, b and c are the characteristics under different ambient temperature operating conditions. It will be seen that there is a drop-off in the power of the pulse with time which is referred to as a power droop.

The adaptive processor in second embodiment, FIG. 2, monitors the power at the output 5 of the pulse and at Td the end of the pulse determines a correction which is applied to the amplitude pulse shaping filter 17.

During the next pulse, with the commencement of the pulse indicated by the signal TXON on input 8, the amplitude pulse shaping filter 17 provides a control signal to the power supply 18 to provide more power to compensate for the amplifier characteristics and the power droop. Thus, referring to characteristics shown in FIG. 3, if the previous pulse was determined to have a characteristic a by the detection of power point 30 at the end of the pulse $T_d$, then the power supply 18 is driven by the amplitude pulse shaping filter 17 to produce a characteristic without the power droop indicated by broken line 31. The pulse shaping filter 17 has associated with it a set of weights to be applied depending upon which of the characteristic curves a, b or c that are detected. Thus, it will be appreciated that for the depicted characteristics the power supply 18 will be increased during the duration of the pulse. It will also be appreciated that these characteristics are merely representative and that they may be more complex than those depicted.

Figure 4:
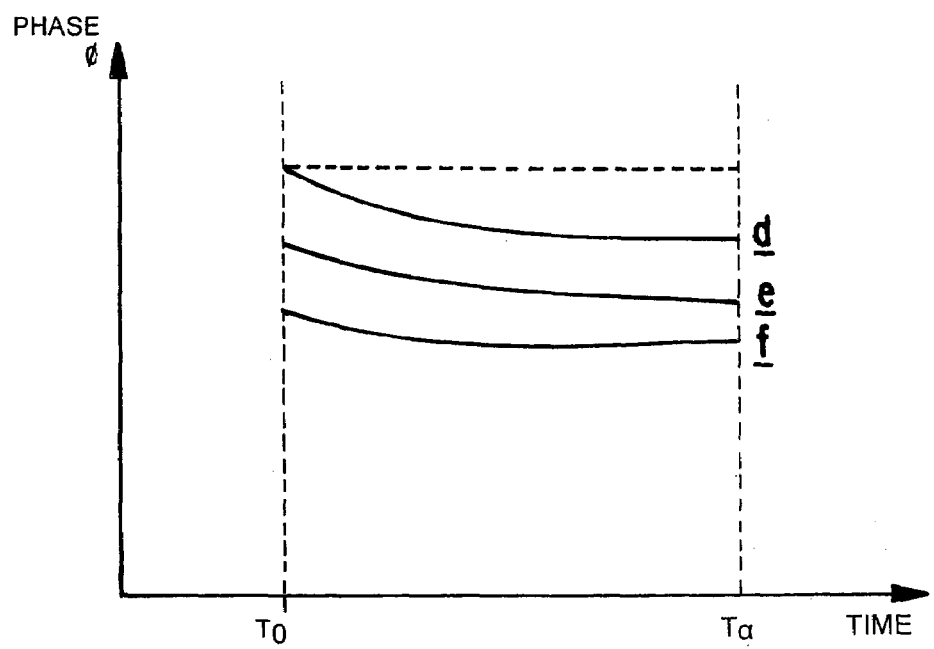
FIG. 4 shows a graph of the phase characteristics of the output pulse with time.

Both embodiments control the phase of the signal applied to the amplifier 4. (In the first embodiment of FIG. 1 only the phase is controlled). In FIG. 4 we have a graph of the way in which the phase of the output pulse will vary over the duration of the pulse between $T_o$ the start period of the pulse and $T_d$ the end time of the pulse. The characteristics are shown by curves d, e and f. The adaptive processor 13 considers the phase at the end of the pulse time $T_d$ and thus identifies the characteristic. A control signal is passed to the phase pulse shaping filter 9 and a set of weights appropriate for that characteristic applied to the phase shifter 3. The phase shifter 3 then controls the phase of the input pulse to the amplifier 4 in anticipation of the phase shift that the amplifier will introduce. The output of the next pulse will therefore be rendered closer to the ideal constant phase curve 40 shown in broken outline. Again, the output curves of FIG. 4 are for the purposes of explanation and may be more complex.

For both embodiments, it will be seen that the output of the amplifier is monitored and corrections applied to the input phase or the power control of the amplifier appropriate for the determined performance. The corrections are applied to subsequent pulses until the next test indicates a different correction is required. The test itself may be applied to every pulse or periodically.

In the described embodiments each radiating element includes the same output stage. However, some economy may be facilitated by arranging the adaptive processing of one output stage to provide control signals to the stages providing a pulse for the other elements. This may be done taking into account the distribution of the elements in the array.

The invention claimed is:

1. Apparatus for producing an amplified Radio Frequency (RF) pulse comprising:
   an input for receiving an RF pulse to be amplified,
   a phase shifter for shifting the phase of the RF pulse to be amplified,
   an amplifier for amplifying the RF pulse to be amplified after the pulse has passed through the phase shifter to produce the amplified RF pulse at an output,
   a controller coupled to the output to determine from the output a current deviation of a parameter of the amplified RF pulse and further coupled to the phase shifter to control the phase shifter to provide a phase shift to reduce the deviation for the next amplified RF pulse based on the current deviation.

2. Apparatus as claimed in claim 1 comprising:
   an amplitude controller responsive to the controller coupled to the output to vary the amplitude of the next amplified RF pulse based on the current deviation.

3. Apparatus as claimed in claim 2 wherein the amplitude controller comprises a power supply coupled to the amplifier.

4. Apparatus as claimed in any preceding claim wherein the deviation of a parameter is at least one of amplitude or phase of the amplified pulse.

5. Apparatus as claimed in claim 3 wherein the deviation comprises both amplitude and phase.

6. Apparatus as claimed in any preceding claim wherein the controller coupled to the output comprises an adaptive processor.

7. Radio detection and ranging equipment comprising apparatus as claimed in any preceding claim operably coupled to at least one radiating element.

8. Apparatus for producing an amplified radio frequency pulse substantially as herein before described with reference to and as illustrated by the drawings.

* * * * *